US006615610B1

(12) United States Patent
Pettitt et al.

(10) Patent No.: US 6,615,610 B1
(45) Date of Patent: Sep. 9, 2003

(54) AIR CONDITIONING SYSTEM AND TUBING APPARATUS TO PREVENT HEAT GAIN DUE TO ENGINE COMPARTMENT HEAT

(75) Inventors: Edward Douglas Pettitt, Burt, NY (US); John Paul Telesz, East Amherst, NY (US); Jing Zheng, Williamsville, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/183,247

(22) Filed: Jun. 26, 2002

(51) Int. Cl.[7] .................... F25B 41/00; F25B 39/04
(52) U.S. Cl. ................ 62/509; 62/513; 62/512; 62/474
(58) Field of Search .................. 62/512, 513, 509, 62/474

(56) References Cited

U.S. PATENT DOCUMENTS

| 4,537,045 A | * | 8/1985 | Mayer ..................... 62/503 |
| 4,982,576 A | * | 1/1991 | Proctor et al. ............. 62/292 |
| 5,479,790 A | * | 1/1996 | Bottum, Jr. et al. ......... 62/503 |
| 6,244,060 B1 | * | 6/2001 | Takano et al. ............ 62/196.4 |
| 6,253,572 B1 | * | 7/2001 | Bottum, Sr. et al. ......... 62/509 |
| 6,371,202 B1 | * | 4/2002 | Takano et al. ............. 165/202 |
| 6,422,308 B1 | * | 7/2002 | Okawara et al. ........... 165/202 |
| 6,467,300 B1 | * | 10/2002 | Noble, III ................. 62/472 |
| 6,516,628 B2 | * | 2/2003 | Izawa et al. ............... 62/509 |

* cited by examiner

Primary Examiner—William C. Doerrler
Assistant Examiner—Mark Shulman
(74) Attorney, Agent, or Firm—Patrick M. Griffin

(57) ABSTRACT

A concentric tubing apparatus prevents heat gain in an air conditioning system. The heat gain results from heat generated in an engine compartment of a vehicle. To accomplish this, the tubing apparatus includes a first and second refrigerant tubes. The first refrigerant tube is in fluid communication with a receiver and an evaporator of the air conditioning system to accommodate the flow of the refrigerant from the receiver to the evaporator, and the second refrigerant tube is in fluid communication with the receiver and the evaporator to accommodate the flow of the refrigerant from the evaporator to the receiver. The second refrigerant tube is disposed concentrically about the first refrigerant tube such that the second refrigerant tube insulates the refrigerant flowing in the first refrigerant tube from the heat generated in the engine compartment. Thus, heat gain in the refrigerant flowing in the first refrigerant tube to the evaporator is prevented.

15 Claims, 3 Drawing Sheets

AIR CONDITIONING SYSTEM AND TUBING APPARATUS TO PREVENT HEAT GAIN DUE TO ENGINE COMPARTMENT HEAT

RELATED APPLICATIONS

The subject application is related to commonly-assigned U.S. patent application Ser. No. 10/183,231 entitled "Multi-Function Receiver" which was filed on the same day as the subject application.

TECHNICAL FIELD

The subject invention generally relates to a tubing apparatus for use in an air conditioning system of a motor vehicle. More specifically, the subject invention relates to a concentric tubing apparatus and an air conditioning system that are able to prevent heat gain in refrigerant due to heat that is generated in an engine compartment of the vehicle.

BACKGROUND OF THE INVENTION

Currently, air conditioning systems for vehicles rely on single, or independent, tubes, hoses, and the like to route refrigerant to various components throughout the system. Reliance on independent tubes is inefficient as the system may realize unwanted heat gain from heat that is generated in an engine compartment of the vehicle. Simply stated, the independent tubes are not shielded or insulated from this heat. In particular, this unwanted heat gain is realized at a low pressure liquid refrigerant line that extends between a receiver and an evaporator of the system to accommodate the flow of the refrigerant from the receiver to the evaporator.

The prior art air conditioning systems that rely on independent tubes are also deficient, as each independent tube must be appropriately sealed at their respective ends. As understood by those skilled in the art, the more seals required throughout a system, the more time required for assembly and the greater the likelihood of a leak that may cause complete system failure. Furthermore, even without complete system failure, the overall performance of the system may be sacrificed due to gradual leaks.

Due to the inadequacies of the prior art, including those described above, it is desirable to provide a concentric tubing apparatus and an air conditioning system that utilizes the concentric tubing apparatus where the apparatus is able to prevent heat gain in refrigerant due to heat that is generated in an engine compartment of a vehicle. It would also be advantageous to minimize a total number of seals required to appropriately seal the air conditioning system.

SUMMARY OF THE INVENTION

A concentric tubing apparatus and an air conditioning system utilizing the concentric tubing apparatus are disclosed. The air conditioning system includes a refrigerant compressor, a condenser, a multi-function receiver, and an evaporator. The condenser is in fluid communication with an outlet of the compressor. The receiver includes an outer cavity and an inner cavity. The outer cavity of the receiver is in fluid communication with an outlet of the condenser for receiving the refrigerant from the condenser. The evaporator is in fluid communication with the outer cavity of the receiver for receiving the refrigerant from the receiver. The evaporator is also in fluid communication with the inner cavity of the receiver for sending the refrigerant through the inner cavity and to an inlet of the compressor. The concentric tubing apparatus, and therefore the air conditioning system including the concentric tubing apparatus, prevent heat gain in the refrigerant due to heat generated in an engine compartment of a vehicle.

The concentric tubing apparatus includes a first and second refrigerant tube. The first refrigerant tube, i.e., the low pressure liquid refrigerant line, is in fluid communication with the receiver and the evaporator to accommodate the flow of the refrigerant from the outer cavity of the receiver to the evaporator. The second refrigerant tube, i.e., the suction or suction gas line, is in fluid communication with the receiver and the evaporator to accommodate the flow of the refrigerant from the evaporator to the inner cavity of the receiver.

The second refrigerant tube is disposed concentrically about, or outside, the first refrigerant tube. As such, the second refrigerant tube insulates the refrigerant flowing in the first refrigerant tube from the heat generated in the engine compartment. Thus, undesirable heat gain in the refrigerant in the first refrigerant line is prevented.

Accordingly, the subject invention provides a tubing apparatus that utilizes concentric tubes, or a tube within a tube, to effectively insulate a low pressure liquid refrigerant line from heat that is generated in an engine compartment of a vehicle thereby preventing undesirable heat gain in the low pressure liquid refrigerant line. Additionally, it is advantageous that the concentric tubing apparatus minimizes a total number of seals required to appropriately seal an air conditioning system that utilizes this concentric tubing apparatus.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Referring to the Figures, wherein like numerals indicate like or corresponding parts throughout the several views, a concentric tubing apparatus is generally disclosed at 68. The concentric tubing apparatus 68 is utilized in combination with a multi-function receiver that is generally disclosed throughout the Figures at 10. The general term "concentric" is intended to cover any structure in which one tube is disposed within the other, regardless of whether the two axes are exactly aligned or co axial. The multi-function receiver 10 is described below as "the receiver". For descriptive purposes only, the multi-function receiver 10 is described prior to the concentric tubing apparatus 68. In addition to that described below, the multi-function receiver 10 is described in commonly-assigned United States patent application entitled "Multi-Function Receiver" which was filed on the same day as the subject application, the disclosure of which is herein incorporated by reference in its entirety.

Figure 1:
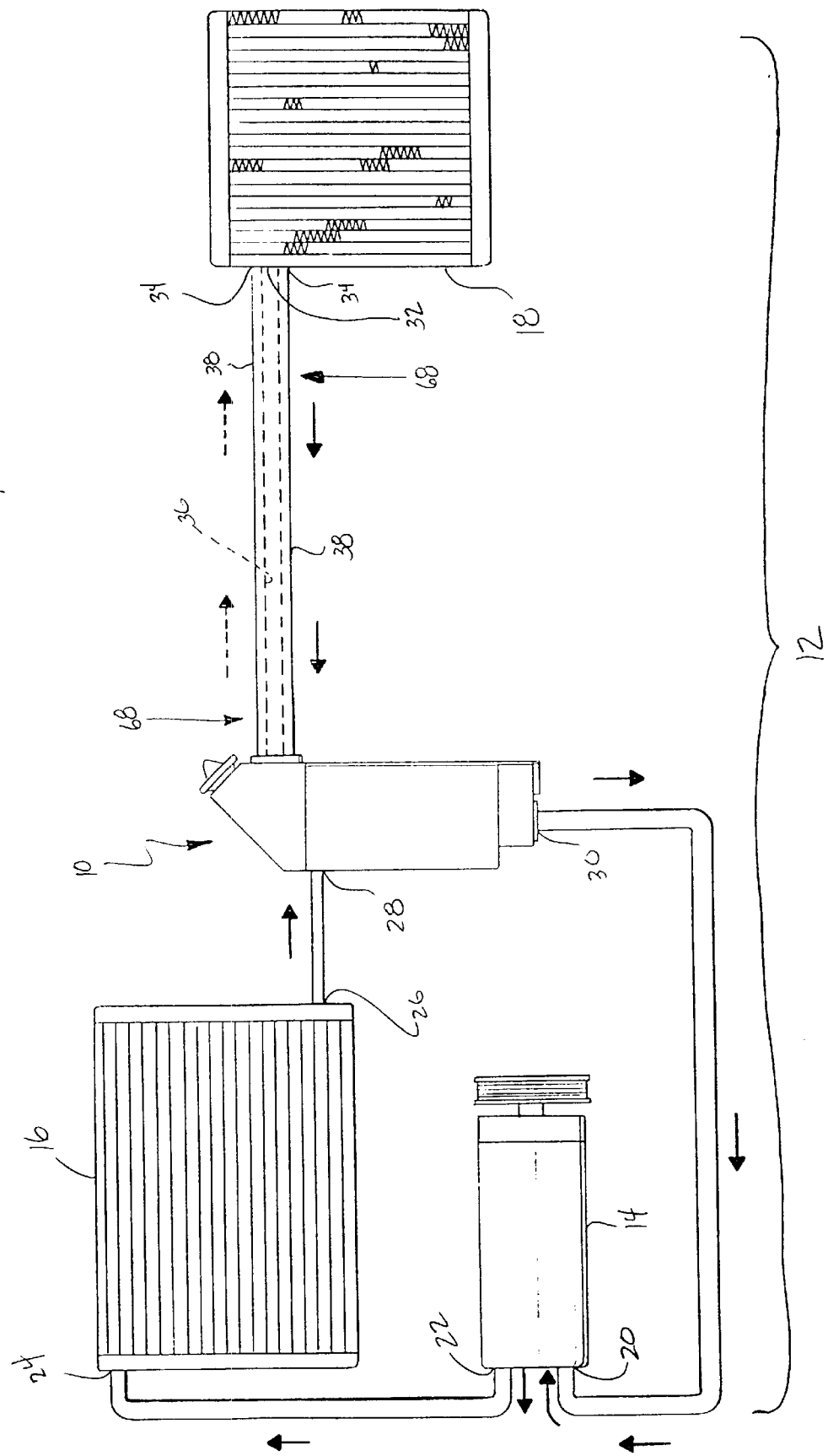
FIG. 1 is a schematic view of an air conditioning system illustrating a refrigerant compressor, a condenser, a multi-function receiver, an evaporator, and a concentric tubing apparatus according to the subject invention extending between the receiver and the evaporator.

Referring particularly to FIG. 1, the receiver 10 is used in an air conditioning system, which is generally indicated at 12. The air conditioning system 12 includes a refrigerant compressor 14, a condenser 16, the receiver 10, and an evaporator 18. The compressor 14 has a compressor inlet 20 and a compressor outlet 22, the condenser 16 has a condenser inlet 24 and a condenser outlet 26, the receiver 10 has a receiver inlet 28 and a receiver outlet 30, and the evaporator 18 has an evaporator inlet 32 and an evaporator outlet 34.

The condenser 16 is in fluid communication with the compressor outlet 22. More specifically, the condenser inlet 24 is in fluid communication with the compressor outlet 22. The compressor 14 pumps the refrigerant to the condenser 16 where a phase of the refrigerant changes from a vapor to a liquid due to the removal of heat by the condenser 16. The refrigerant then flows into the receiver 10 where it is stored for flow into the evaporator 18. As disclosed in FIG. 1, in one sense the receiver 10 is disposed in the flow between the condenser 16 and the evaporator 18, and in another sense the receiver 10 is disposed in the flow between the evaporator 18 and the compressor 14. The evaporator 18 is in fluid communication with the condenser outlet 26, through the receiver 10, and in fluid communication with the compressor inlet 20, through the receiver 10. The refrigerant flows from the receiver 10 into the evaporator 18 where it functions to cool air that is to be directed into a passenger compartment of a vehicle. The phase of the refrigerant changes to a vapor and returns to the compressor inlet 20 via the receiver 10. That is, in the subject invention, the vaporized refrigerant is re-routed through the receiver 10 as described below. Although the evaporator 18 is not in direct fluid communication with the compressor inlet 20, it is to be understood that the evaporator 18 is in fluid communication with the compressor inlet 20 through the receiver 10. The air conditioning system 12 also includes first and second refrigerant tubes 36, 38. In the art, the first refrigerant tube 36 is commonly referred to as the low pressure liquid refrigerant line and the second refrigerant tube 38 is commonly referred to as the suction line. The first and second refrigerant tubes 36, 38 extend between the receiver 10 and the evaporator 18 and are described below. The receiver 10 of the present invention, and therefore the air conditioning system 12 which includes the receiver 10, attenuate.pressure fluctuations of refrigerant flowing from the evaporator 18 to the refrigerant compressor 14. As a result, any noise, e.g. tone, that is associated with the pressure fluctuations of the refrigerant is minimized, if not entirely eliminated. The pressure fluctuations of the refrigerant are also referred to in the art as pulsations. For the purposes of the subject invention, use of the terminology "in fluid communication with" is not intended to require direct connection between any two components of the air conditioning system 12.

Figure 2:
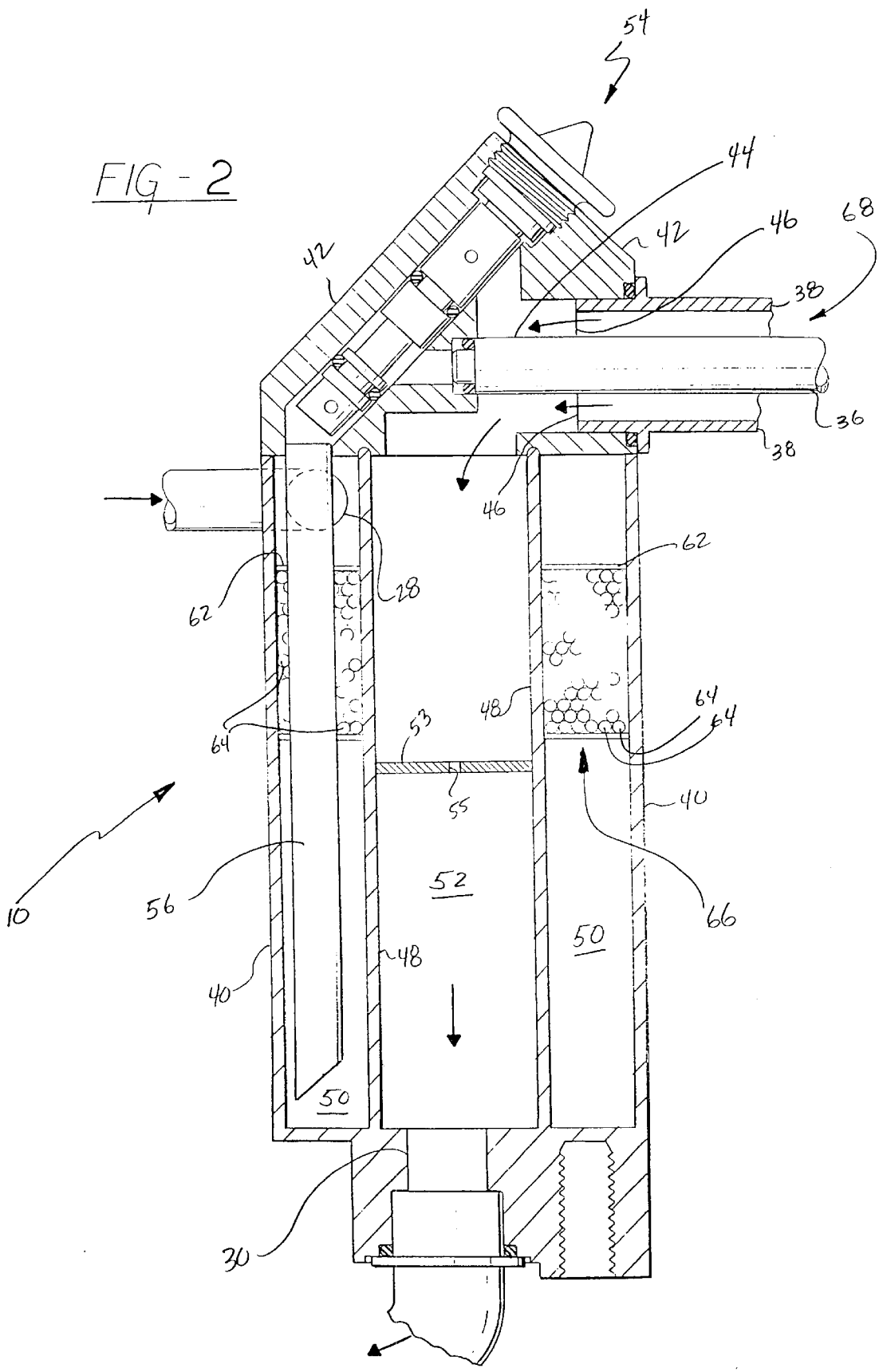
FIG. 2 is a partially cross-sectional side view of the receiver illustrated in FIG. 1 having concentric first and second refrigerant ports in combination with concentric first and second refrigerant tubes.

Referring now to FIG. 2, the receiver 10 comprises a body housing 40 and a cap housing 42 covering the body housing 40. The receiver 10 is oriented vertically throughout the Figures such that the cap housing 42 is disclosed on top of the body housing 40. However, although it is not preferred, the receiver 10 may be otherwise oriented such that the cap housing 42 is not on top of the body housing 40 yet still covers the body housing 40. For instance, the body housing 40 may be oriented horizontally and the cap housing 42 could cover the body housing 40 on a right or left side of the body housing 40. The body housing 40 comprises the receiver inlet 28 and the receiver outlet 30. The receiver inlet 28 receives the refrigerant from the condenser 16, and the receiver outlet 30 sends the refrigerant to the compressor 14.

First and second refrigerant ports 44, 46 are defined within the cap housing 42. The first refrigerant port 44 is in fluid communication with the evaporator 18 for sending the refrigerant to the evaporator 18, and the second refrigerant port 46 is in fluid communication with the evaporator 18 for receiving the refrigerant from the evaporator 18. As disclosed in FIG. 2, the first and second refrigerant ports 44, 46 are defined concentrically within the cap housing 42. More specifically, the second refrigerant port 46 is defined concentrically about, or outside, the first refrigerant port 44.

The receiver 10 further comprises an internal wall 48. The internal wall 48 defines an outer cavity 50 and an inner cavity 52. More specifically, the internal wall 48 extends between the cap housing 42 and the receiver 10 outlet of the body housing 40 to define the inner and outer cavities 52, 50. The outer cavity 52 is in fluid communication with both the receiver inlet 28 and the first refrigerant port 44. As such, the outer cavity 50 receives the refrigerant from the condenser 16 through the receiver inlet 28 and sends the refrigerant to the evaporator 18 through the first refrigerant port 44.

In the most preferred embodiment of the subject invention, the internal wall 48 is annular within the body housing 40. As such, in this embodiment the outer cavity 50 is further defined as an outer annular cavity 50 and the inner cavity 52 is further defined as an inner annular cavity 52. For descriptive purposes only, the inner and outer cavities 52, 50 are hereinafter referred to as the inner and outer annular cavities 52, 50, respectively.

The inner annular cavity 52 is in fluid communication with both the second refrigerant port 46 and the receiver outlet 30. As such, the inner annular cavity 52 receives the refrigerant from the evaporator 18 to attenuate the pressure fluctuations of the refrigerant received from the evaporator 18. The inner annular cavity 52 essentially functions as a suction gas muffler integrated in the receiver 10. Therefore, a separate suction gas muffler is not required in this air conditioning system 12. Because the refrigerant is re-routed back through the inner annular cavity 52, the inner annular cavity 52 also functions to sub-cool the refrigerant in the outer annular cavity 50 by simple heat transfer. The refrigerant returning from the evaporator 18 into the inner annular cavity 52 is a vapor having a temperature generally ranging from 35 to 40° F. This vaporized refrigerant removes heat from the liquid refrigerant in the outer annular cavity 50 which has a temperature generally ranging from 125 to 140° F. Also, because the inner annular cavity 52 is in fluid communication with the receiver outlet 30, the refrigerant is sent to the compressor 14 through the receiver outlet 30 after the pressure fluctuations have been attenuated.

To appropriately attenuate the pressure fluctuations, the inner annular cavity 52 is essentially an attenuation chamber that provides a volume that is sufficient to muffle, dampen, and/or suppress the pressure fluctuations. The attenuation chamber is shown, but not numbered, in the Figures. It is to be understood that the volume may be strategically modified to improve the attenuation capabilities of the inner annular cavity 52. For instance, an overall length, cross-section, or diameter of the inner annular cavity 52 may be modified to improve the attenuation capabilities.

Alternatively, a plurality of attenuation chambers may be utilized to improve the attenuation capabilities of the inner annular cavity 52. In such a case, the receiver 10 further comprises at least one baffle 53. The baffle is disposed in the inner annular cavity 52 to define the plurality of attenuation chambers. In FIG. 2, the plurality of attenuation chambers are defined below and above the baffle 53. Furthermore, although FIG. 2 discloses a single baffle 53, the subject invention may include a plurality of baffles 53 to establish more than two attenuation chambers. For instance, if there are two baffles 53 disposed in the inner annular cavity 52, then three attenuation chambers will be defined. The attenuation chambers may be identically tuned, i.e., engineered, or may be differently tuned for attenuating the pressure fluctuations of the refrigerant flowing from the evaporator 18 to the refrigerant compressor 14. The baffle 53 may be of any shape that is suitable to define the plurality of attenuation chambers within the inner cavity 52. Obviously, in the embodiments where the inner cavity 52 is the inner annular cavity 52, it is preferred that the baffle 53, or baffles 53 if plural, are also annular such that they are washer or ring-like inserts into the inner annular cavity 52.

As an example, if there is a single baffle 53 disposed in the inner annular cavity 52, then this single baffle 53 defines first and second attenuation chambers within the inner cavity. For the refrigerant to flow from one attenuation chamber to another, it is preferred that the receiver 10 further comprises at least one fluid hole 55 defined in the baffle 53. Of course, although not shown, it is possible that there may be a plurality of fluid holes 55 defined in the baffle 53. As such, the refrigerant flows from the evaporator 18, through the second refrigerant port 46, into the first attenuation chamber, through the fluid hole 55 or holes 55 in the baffle 53, into the second attenuation chamber, and to the receiver outlet 30 for sending to the compressor 14.

Although a thermostatic expansion valve (TXV) is not required, the particular embodiment disclosed in FIG. 2 includes a TXV 54 disposed in the cap housing 42 of the receiver 10. The TXV 54 is in fluid communication with the outer annular cavity 50 and with the first refrigerant port 44 for controlling the refrigerant to be sent to the evaporator 18 from the outer annular cavity 50 through the TXV 54 and the first refrigerant port 44. As is understood by those skilled in the art, the TXV 54 controls the flow of the refrigerant into the evaporator 18 by sensing or monitoring a superheat of the refrigerant that exits the evaporator 18 in the second refrigerant tube 38, i.e., the suction line. Because the refrigerant from the evaporator 18 is returned back through the receiver 10, the TXV 54 can sense or monitor the superheat directly in the inner cavity 52 of the receiver 10 and an external superheat sensing bulb is not required in the system 12 to sense the superheat elsewhere. Preferably, a pick-up tube 56 extends between the TXV 54 and the outer annular cavity 50 to accommodate the flow of the refrigerant from the outer annular cavity 50 to the TXV 54. Although not required, if, as in this embodiment, the TXV 54 is actually disposed in the cap housing 42, then it is preferred that the TXV 54 is a cartridge-type. TXV 54.

The receiver 10 may further comprise a filter 62. The filter 62 is disposed in the outer cavity 50 for filtering debris from the refrigerant. The filter 62 is represented schematically in the Figures. The receiver 10 may also further comprise a desiccant 64 for dehydrating the refrigerant. The desiccant 64 is also disposed in the outer cavity 50. If the outer cavity 50 is annular, then it is preferred that the filter 62 is an annular filter cartridge disposed in the outer annular cavity 50 and that the desiccant is an annular desiccant cartridge disposed in the outer annular cavity 50. In any embodiment, the filter 62 and the desiccant 64 may be separate. However, it is preferred that the filter 62 and desiccant 64 are combined into a single, filter/desiccant cartridge 66. Such cartridges are known in the art.

As initially set forth above, the receiver 10 functions in combination with first and second refrigerant tubes 36, 38 of the air conditioning system 12. The first refrigerant tube 36 is connected with the first refrigerant port 44 and with the evaporator 18 to accommodate the flow of the refrigerant from the receiver 10 to the evaporator 18. More specifically, the first refrigerant tube 36 accommodates the flow of the refrigerant from the outer annular cavity 50 through the first refrigerant port 44 and to the evaporator 18. The second refrigerant tube 38 is connected with the second refrigerant port 46 and with the evaporator 18 to accommodate the flow of the refrigerant from the evaporator 18 to the receiver 10. More specifically, the second refrigerant tube 38 accommodates the flow of the refrigerant from the evaporator 18 through the second refrigerant port 46 and to the inner annular cavity 50.

Figure 3:
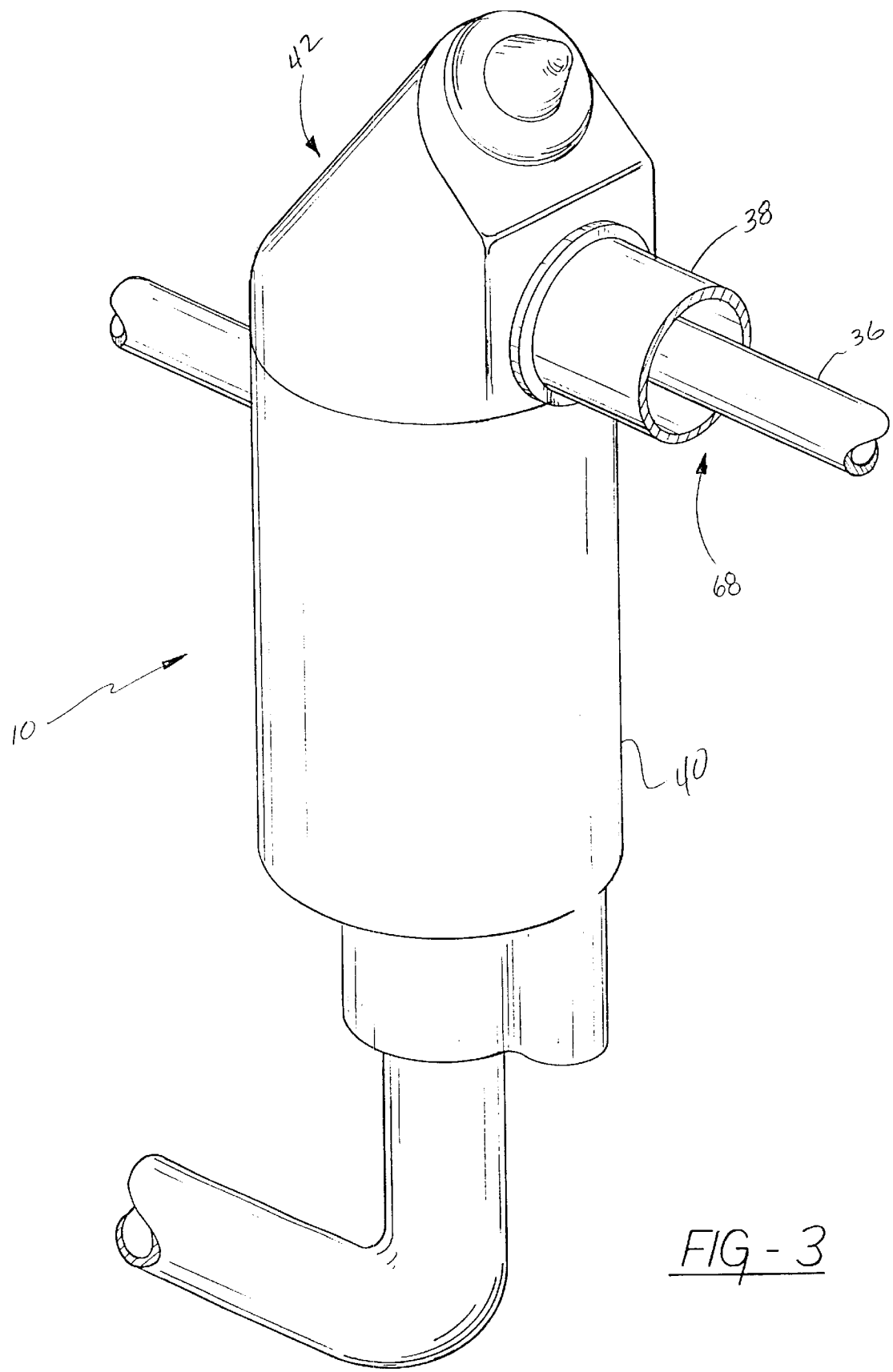
FIG. 3 is a perspective view of the concentric tubing apparatus extending from the receiver.

The first and second refrigerant ports 44, 46 are defined concentrically within the cap housing 42, the first and second refrigerant tubes 36, 38, which are respectively connected with the first and second refrigerant ports 44, 46, are concentric relative to each other. As such, because it is most preferred that the second refrigerant port 46 is defined concentrically about, or outside, the first refrigerant port 44, the second refrigerant tube 38 is preferably disposed concentrically about, or outside, the first refrigerant tube 36. In other words, the first refrigerant tube 36 is primarily disposed within the second refrigerant tube 38. In this embodiment, a diameter of the first refrigerant tube 36 is less than the diameter of the second refrigerant tube 38. The concentric relationship between the first and second refrigerant tubes 36, 38, as well as the preferred relationship between the respective diameters of the first and second refrigerant tubes 36, 38, are also disclosed in FIG. 3.

Together, the first and second refrigerant tubes 36, 38 establish the concentric tubing apparatus 68. The concentric tubing apparatus 68 eliminates independent tubes connected between the receiver 10 and the evaporator 18. As such, a total number of seals required to appropriately seal the tubes within the air conditioning system 12 is minimized thereby minimizing the likelihood of leaks and seal permeation resulting in decreased performance of the system 12.

The first and second refrigerant tubes 36, 38 are not independent. Instead these tubes 36, 38 are co-dependent with the first refrigerant tube 36 within the second refrigerant tube 38, and with the second refrigerant tube 38 insulating the first refrigerant tube 36. The concentric tubing apparatus 68 enables the air conditioning system 12 to prevent heat gain in the refrigerant due to heat generated in an engine compartment of the vehicle. More specifically, the concentric tubing apparatus 68 insulates the refrigerant from this heat. That is, the second refrigerant tube 38 is disposed concentrically about, or outside, the first refrigerant tube 36 to insulate the first refrigerant tube 36, and the refrigerant flowing in the first refrigerant tube 36 to the evaporator 18, from the heat generated in the engine compartment. Thus, heat gain in the refrigerant flowing in the first refrigerant tube 36 to the evaporator 18 is prevented. Furthermore, insulation of the refrigerant in the first refrigerant tube 36 from the heat, leaves more enthalpy potential for the refrigerant to absorb heat in the evaporator 18.

The receiver 10 of the subject invention is multi-functional in the sense that it functions as a reservoir for the refrigerant, a filter 62, a desiccant 64, a suction gas muffler, and a sub-cooler for the refrigerant in the outer annular cavity 50.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An air conditioning system for preventing heat gain due to heat generated in an engine compartment of a vehicle, said air conditioning system comprising:

a refrigerant compressor;

a condenser in fluid communication with an outlet of said refrigerant compressor;

a multi-function receiver comprising an outer cavity and an inner cavity wherein said outer cavity is in fluid communication with an outlet of said condenser for receiving the refrigerant from said condenser;

an evaporator in fluid communication with said outer cavity of said receiver for receiving the refrigerant from said receiver and with said inner cavity of said receiver for sending the refrigerant through said inner cavity and to an inlet of said refrigerant compressor;

a first refrigerant tube in fluid communication with said receiver and said evaporator to accommodate the flow of the refrigerant from said outer cavity of said receiver to said evaporator; and a second refrigerant tube in fluid communication with said receiver and said evaporator to accommodate the flow of the refrigerant from said evaporator to said inner cavity of said receiver;

wherein said second refrigerant tube is disposed concentrically about said first refrigerant tube such that said second refrigerant tube insulates the refrigerant flowing in said first refrigerant tube from the heat generated in the engine compartment thereby preventing heat gain in the refrigerant flowing in said first refrigerant tube to said evaporator.

2. An air conditioning system as set forth in claim 1 further comprising a first refrigerant port defined within said receiver and in fluid communication with said outer cavity for sending the refrigerant through said first refrigerant port to said evaporator.

3. An air conditioning system as set forth in claim 2 further comprising a second refrigerant port defined within said receiver and in fluid communication with said inner cavity for receiving the refrigerant from the evaporator into said inner cavity.

4. An air conditioning system as set forth in claim 3 wherein said first refrigerant tube is connected with said first refrigerant port to accommodate the flow of the refrigerant from said outer cavity of said receiver to said evaporator.

5. An air conditioning system as set forth in claim 4 wherein said second refrigerant tube is connected with said second refrigerant port to accommodate the flow of the refrigerant from said evaporator to said inner cavity of said receiver.

6. An air conditioning system as set forth in claim 5 wherein said first and second refrigerant ports are defined concentrically within said receiver.

7. An air conditioning system as set forth in claim 6 wherein said second refrigerant port is defined concentrically about said first refrigerant port.

8. An air conditioning system as set forth in claim 2 further comprising a thermostatic expansion valve in fluid communication with said outer cavity and with said first refrigerant port for controlling the refrigerant to be sent to said evaporator from said outer cavity.

9. An air conditioning system as set forth in claim 1 wherein said receiver further comprises an internal wall defining said outer and inner cavities.

10. An air conditioning system as set forth in claim 9 wherein said internal wall of said receiver is annular such that said outer cavity of said receiver is further defined as an outer annular cavity and said inner cavity of said receiver is further defined as an inner annular cavity.

11. An air conditioning system as set forth in claim 1 wherein said first and second refrigerant tubes each have a diameter, said diameter of said first refrigerant tube being less than said diameter of said second refrigerant tube.

12. A concentric tubing apparatus adapted for use in an air conditioning system wherein the air conditioning system includes refrigerant, a refrigerant compressor, a condenser in fluid communication with an outlet of the refrigerant compressor, a multi-function receiver in fluid communication with an outlet of the condenser for receiving the refrigerant from the condenser, and an evaporator in fluid communication an outer cavity of the receiver for receiving the refrigerant from the receiver and with an inner cavity of the receiver for sending the refrigerant to the receiver and to an inlet of the refrigerant compressor, wherein said concentric tubing apparatus prevents heat gain due to heat generated in an engine compartment of a vehicle and comprises:

a first refrigerant tube adapted to be in fluid communication with the receiver and the evaporator to accommodate the flow of the refrigerant from the receiver to the evaporator; and a second refrigerant tube adapted to be in fluid communication with the receiver and the evaporator to accommodate the flow of the refrigerant from the evaporator to the receiver;

wherein said second refrigerant tube is disposed concentrically about said first refrigerant tube such that said second refrigerant tube insulates the refrigerant flowing in said first refrigerant tube from the heat generated in the engine compartment thereby preventing heat gain in the refrigerant flowing in said first refrigerant tube to the evaporator.

13. A concentric tubing apparatus as set forth in claim 12 wherein said first refrigerant tube is adapted to be in fluid communication with the outer cavity of the receiver and the evaporator.

14. A concentric tubing apparatus as set forth in claim 13 wherein said second refrigerant tube is adapted to be in fluid communication with the inner cavity of the receiver and the evaporator.

15. A concentric tubing apparatus as set forth in claim 12 wherein said first and second refrigerant tubes each have a diameter, said diameter of said first refrigerant tube being less than said diameter of said second refrigerant tube.

* * * * *